United States Patent [19]

Leonatti

[11] 4,364,757
[45] Dec. 21, 1982

[54] VACUUM CLEANER FILTER BAG COLLAR ARRANGEMENT

[75] Inventor: John A. Leonatti, Uniontown, Ohio

[73] Assignee: The Hoover Company, North Canton, Ohio

[21] Appl. No.: 295,830

[22] Filed: Aug. 24, 1981

[51] Int. Cl.³ .............................................. B01D 46/02
[52] U.S. Cl. ........................................ 55/357; 55/377; 55/507; 55/509
[58] Field of Search .......................... 55/357, 374–378, 55/507, 509; 210/461

[56] References Cited

U.S. PATENT DOCUMENTS

| 3,137,023 | 6/1964 | Klinge et al. | 55/377 X |
| 3,283,481 | 11/1966 | Studley et al. | 55/376 X |
| 3,870,491 | 3/1975 | Friesen et al. | 55/376 |

FOREIGN PATENT DOCUMENTS 1201841 8/1970 United Kingdom ................. 55/378

Primary Examiner—Kathleen J. Prunner
Attorney, Agent, or Firm—Gerald H. Kreske; A. Burgess Lowe

[57] ABSTRACT

An air filter bag is disclosed for use in vacuum cleaners. The filter bag includes a plastic collar having an annular rim for retaining the collar on a flanged inlet air duct and for establishing an air seal with the duct. The collar also includes an annular sealing lip spaced radially inward of the rim which engages a peripheral surface of the air duct thereby providing a dual sealing arrangement. In order to facilitate removal of the filter bag from the duct, the collar is provided with a tab portion integrally attached to the rim.

11 Claims, 9 Drawing Figures

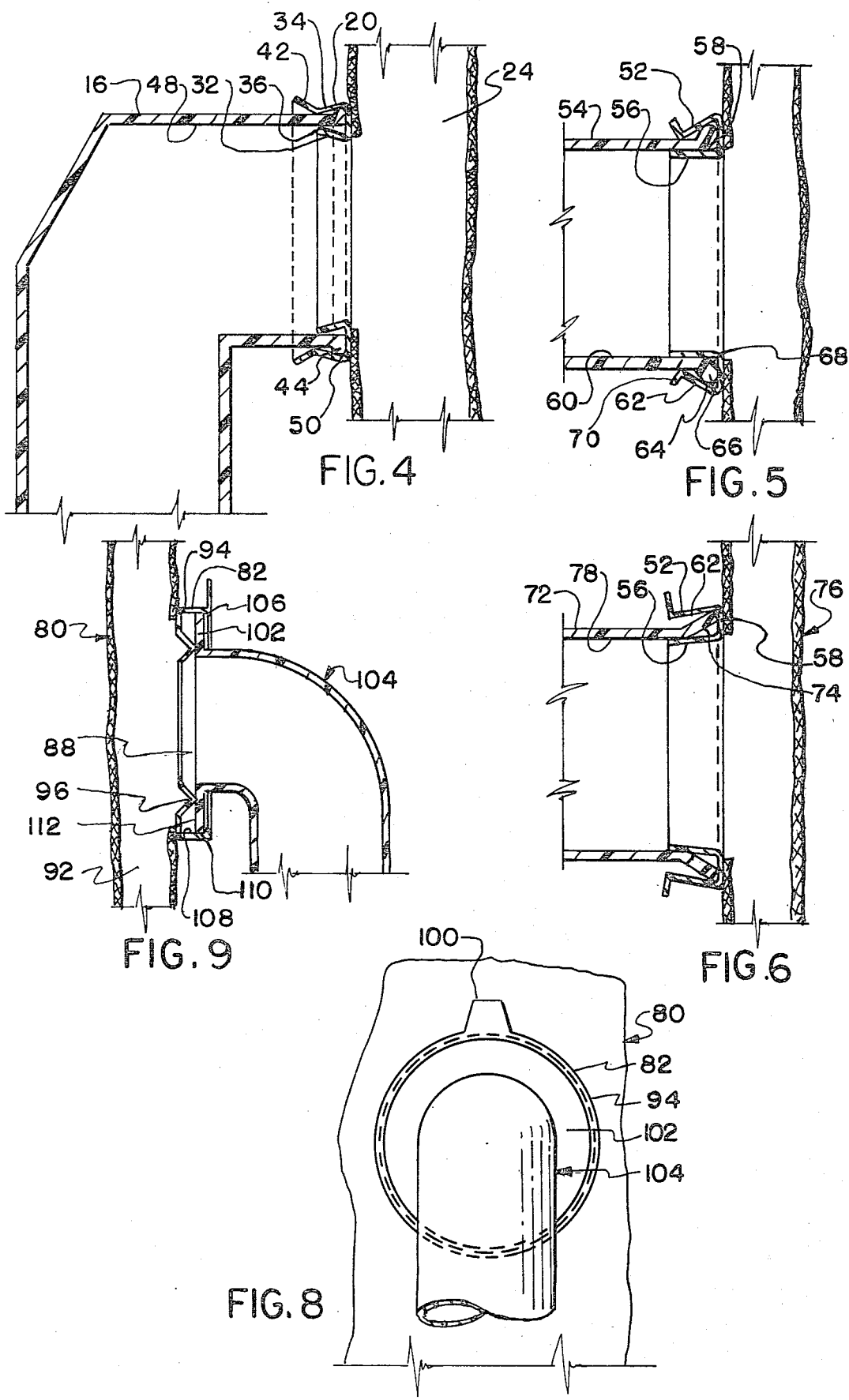

VACUUM CLEANER FILTER BAG COLLAR ARRANGEMENT

BACKGROUND OF THE INVENTION

The present invention relates generally to vacuum cleaners and more particularly, to air filter bags for vacuum cleaners.

Vacuum cleaner filter bags have been provided with numerous collar configurations for interfitting with inlet ducts carrying dirt laden air into the bags. These collars have been formed of materials such as cardboard, rubber, leather, plastic and/or combinations of some of these materials. In order to successfully function, a bag collar must be properly positioned and retained in position relative to an air inlet duct, and the bag collar must have a good air seal established between itself and the inlet duct so as to prevent dirt laden air from bypassing the filter bag.

It is known to fabricate filter bag collars of a plastic material as a way of reducing manufacturing and material cost. Plastic collars have been fabricated with sealing lips adjacent to an aperture in the collars for sealing with the outer periphery of circular air ducts. Retention of the collar on the duct with such collars is accomplished by the frictional engagement of the collar and duct with a rib or stop often being provided on the duct to prevent slippage of the collar from the duct.

It is also known to provide such plastic collars as described above with a molded annular rib spaced radially outward from the aperture to provide the collar with a face seal for use with air ducts having a flange-like or non-tubular configuration at its interface with the collar. However, such arrangements utilizing a flange-like air duct arrangement require a means to retain the collar in position against the duct in order to establish a seal therewith. Such means is generally in the form of a slotted holder into which the collar slides with the holder being attached to or formed integrally with the inlet air duct.

It would be desirable to develop a new and improved filter bag collar arrangement which could provide an air seal with a flanged inlet air duct. Further, it would be desirable to provide such a filter bag collar arrangement which would establish an air seal without requiring a separate holder on the duct for retention and thereby reduce the fabrication expense of the air duct.

Filter bag collars generally provide a single air seal with an air duct although some collars have more than one sealing means with each sealing means being used for different air duct configurations. However, it would be desirable to develop a new and improved filter bag collar with dual sealing capability; that is, a collar that could provide two seals which are usable simultaneously to further assure that a positive air seal is established between the filter bag and duct.

SUMMARY OF THE INVENTION

Accordingly, a general object of the present invention is to provide a new and improved filter bag for use in a vacuum cleaner.

A more specific object of the present invention is to develop a new and improved plastic filter bag collar usable with vacuum cleaners having flanged inlet air duct configurations.

Another object of the present invention is to provide a new and improved plastic filter bag collar arrangement having a retention means integral therewith for use with vacuum cleaners having flanged inlet air duct configurations.

A further object of the present invention is to provide a new and improved plastic filter bag collar arrangement having dual sealing capability.

In carrying out the invention in one form thereof, an air filter bag is provided with a plastic collar having an aperture communicating with an opening to the bag interior. The collar includes an annular rim or skirt which snaps over and engages an outer peripheral surface of a flange for retaining the collar and establishing an air seal between the collar and a flanged inlet air duct of a vacuum cleaner. The rim extends about the outer periphery of the collar and is operable to snap over the flange to retain the collar on the duct and to establish the air seal therebetween.

The plastic filter bag collar may also be provided with an annular sealing lip spaced radially inward of the rim. The annular sealing lip engages a peripheral surface of the inlet air duct to provide an air seal therebetween. Thus, the plastic collar provides a dual seal with the inlet duct via the annular sealing lip and the rim with the rim also retaining the collar on the duct. The plastic filter bag collar may also be provided with a tab portion formed integrally with the rim in order to facilitate removal of the collar from its interfitting relationship with the inlet air duct.

BRIEF DESCRIPTION OF THE DRAWINGS

FIG. 4 is a partial cross sectional view of the filter bag and the flanged inlet air duct of FIG. 3 illustrating their interfitting relationship.

FIG. 5 is an alternate embodiment showing, in a partial cross sectional view, a differently configured filter bag collar and its interfitting relationship with an inlet air duct.

FIG. 6 illustrates, in a partial cross sectional view, the filter bag collar of FIG. 5 assembled on a differently configured flanged inlet air duct.

FIG. 8 is a front elevational view of the filter bag of FIG. 7 illustrating its mounting relationship with a flanged inlet air duct.

FIG. 9 is a partial cross sectional view of FIG. 8 illustrating the filter bag collar mounted on the flanged inlet air duct.

DESCRIPTION OF THE PREFERRED EMBODIMENTS

Figure 2:
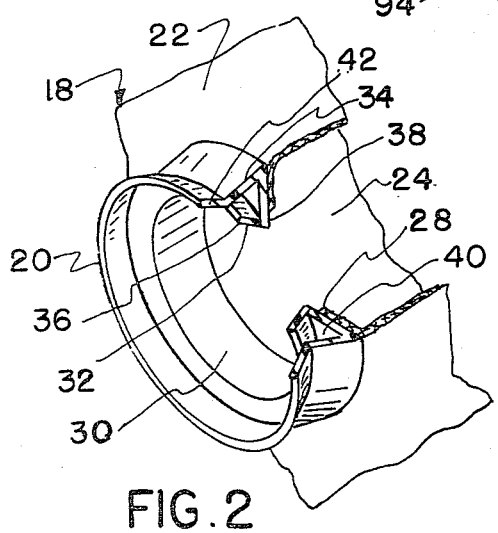
FIG. 2 is a partial perspective view of a filter bag illustrating a plastic filter bag collar.
Figure 1:
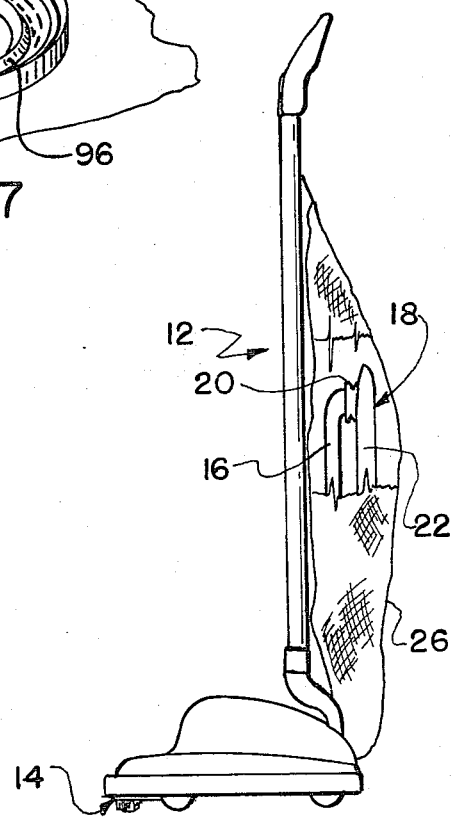
FIG. 1 is a side elevational view, with parts thereof broken away of a vacuum cleaner embodying one form of the invention.

Referring to FIG. 1, there is illustrated a vacuum cleaner 12 of one type which embodies features of the present invention in one form. In the illustrated upright cleaner, dirt, dust and other particles are removed from a surface being cleaned via suction being created at the nozzle portion designated generally by reference numeral 14. The dirt is then transmitted via pressurized air through an air inlet duct 16 to a filter bag 18 connected thereto. The filter bag includes a collar 20 and a filter body portion 22 having a generally tubular configuration which is formed of air-pervious filtering material such as, for example, cloth fabric or paper. The tubular body portion filters the dirt laden air and traps or collects the dirt in the interior portion 24 thereof (FIG. 2). The filtered or clean air emanates from the filter bag and is exhausted to atmosphere through a perforated outer bag or jacket 26 encompassing the filter bag.

As illustrated in FIG. 2, the filter bag 18 includes the bag collar 20 formed of flexible plastic material such as, for example, polystyrene or polyethylene. Although the collar could be molded of polyethylene, it is believed that the collar can be fabricated more economically by vacuum forming from polystyrene to save material and minimize tooling expense. The bag collar is secured to the tubular body portion 22 of the filter bag by glue although it may be secured thereto by other suitable means such as sewing. In mounting, the collar is positioned so that a generally circular shaped bag opening, having its outer margin defined by the illustrated edge 28, communicates with a generally circular shaped aperture 30 of the collar. Thus, dirt laden air is transmitted through the aperture and opening into the bag interior 24.

The bag collar 20 is also provided with an annular flexible lip or inner wall 32 which is spaced radially inward of rim or skirt 34 and which is tapered in an outward direction away from the bag opening. The lip has an outermost tip 36 which engages a peripheral surface of an air duct to provide an air seal as will be discussed more fully hereinbelow. The lip is connected to the rim or outer wall of the collar by a base portion 38 thereby establishing a duct receiving channel 40 between the lip and rim. The inwardly sloped or tapered rim retains the collar on an air duct and provides a means of sealing therebetween as will be discussed hereinbelow. In order to facilitate removal from an air duct, the collar is provided with a removal tab or flared portion 42 extending about the periphery of the collar which is integrally connected with the rim.

Figure 3:
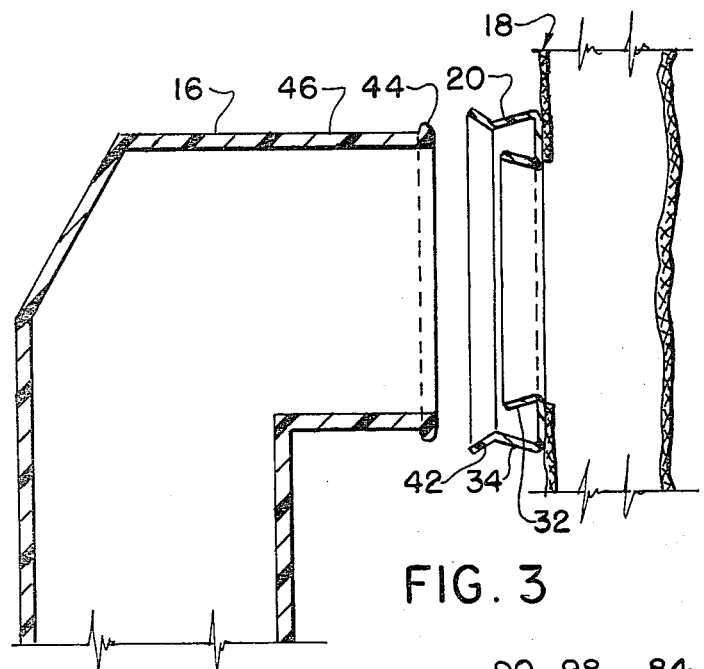
FIG. 3 is a partial cross sectional view of the filter bag and a flanged inlet air duct of the vacuum cleaner of FIG. 1 in a disassembled relationship.

Referring to FIG. 3, the filter bag 18 and the inlet air duct 16 are shown disassembled. As can be seen, the air duct is provided with an arcuate shaped flange or protrusion 44 which extends about the outer periphery 46 of the duct in a continuous manner. In mounting the filter bag, the bag collar 20 is moved toward the duct with the flange engaging the tab 42 and rim 34 causing them to deflect outwardly so that the rim snaps over the flange. Thus, the duct is captured between the lip 32 and the rim 34 of the collar to retain the filter bag on the duct as illustrated in FIG. 4.

As shown in FIG. 4, the annular flexible lip 32 frictionally engages or abuts inner peripheral surface 48 of the duct 16 to establish an air seal therebetween. The lip flexes or deflects during mounting and once in position, the flexible lip exerts radially forces against the inner peripheral surface of the duct with the outermost tip 36 engaging the inner peripheral surface to establish an air seal. The rim 34 snaps over the flange 44 to retain the filter bag on the duct and further, to provide a second air seal. The rim engages the outer peripheral surface 50 of the flange to provide the second air seal thereby providing the collar 20 with dual sealing capability to further assure that dirt laden air flows from the duct into the bag interior 24 for filtering. After it becomes full, the filter bag can be removed from the flange by pulling upon the tab portion 42. The pulling force causes deflection of the rim or outer wall to permit movement of the collar away from the flange.

FIG. 5 illustrates a modified plastic bag collar 52 mounted on an inlet air duct 54. This bag collar differs from the previously described bag collar 20 (FIGS. 1-4) in that a longitudinally extending annular flexible lip 56 is provided which extends substantially perpendicular to collar base portion 58. The lip abuts or frictionally engages inner peripheral surface 60 of the duct to provide an air seal therebetween. Annular rim 62 engages outer peripheral surface 64 of flange 66 to retain the collar on the duct and to provide a second seal between the duct and collar in the same manner as described previously for annular rim 34 (FIGS. 2-4). Interfitting of the duct and collar is facilitated by providing the flange with a tapered portion 68 which permits easy movement or camming of the lip past the flange during the mounting process. Removal tab 70 which is integrally attached to the rim, is provided to facilitate removal of the collar from the flange.

FIG. 6 illustrates the bag collar 52 mounted on an inlet air duct 72 having a differently configured flange in the form of flared end portion 74. As can be seen, the flared end portion is captured between the annular rim 62 and the annular lip 56 so as to retain the filter bag 76 on the duct. The flexible lip engages inner peripheral surface 78 of the air duct to provide an air seal therebetween. Further, engagement of the flared portion of the duct with the base portion 58 and rim of the collar provide additional sealing capability between the collar and duct.

Figure 7:
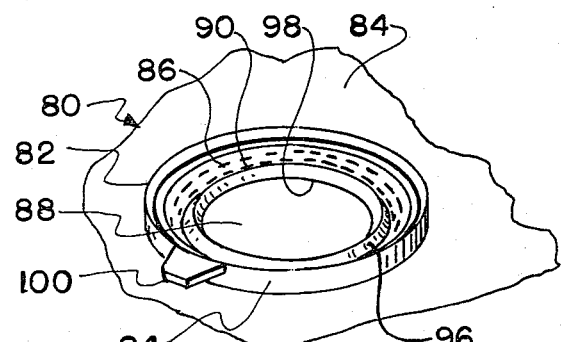
FIG. 7 is a preferred filter bag collar arrangement, shown in a partial perspective view, which was developed by the assignee of the present invention subsequent to development by the inventor of the embodiment illustrated in FIGS. 1–4 and which embodies features of the present invention.

FIGS. 7-9 illustrate a filter bag arrangement developed by the assignee of the present invention subsequent to development by the inventor of the embodiment illustrated in FIGS. 1-4 and which is not part of the present invention. However, the illustrated arrangement encompasses many of the features of the present invention and is believed by the assignee to be the preferred way of carrying out the present invention. Referring to FIG. 7, a filter bag 80 is illustrated which includes a plastic collar 82 and a filter body portion 84 formed of air-pervious filtering material such as paper or fabric. The collar is secured to the filter body by stitches 86 with aperture 88 of the collar communicating with bag opening 90 to permit dirt laden air to be transmitted through the aperture and opening into bag interior portion 92 (FIG. 9). As with previously illustrated and discussed arrangements, the plastic collar has dual sealing capability when utilized with a flanged inlet air duct. An annular rim or skirt 94 extending about the periphery of the collar provides a means of establishing an air seal while also providing a means for retaining the filter bag on a flanged duct as will be discussed more fully hereinbelow. The collar is also provided with additional sealing means illustrated as annular rib 96 which is spaced radially inward of the rim. An annular flexible lip 98 which is also spaced radially inward of the rim is provided which can be used to establish an air seal with an air duct having a non-flanged and generally circular outer periphery at a filter bag and duct interface. The lip frictionally engages an outer periphery of such a duct to provide an air seal therebetween. As with previously described arrangements, the collar is provided with a removal tab 100 integrally attached to or formed with the rim to facilitate removal of the collar from a flanged duct.

As shown in FIG. 8, the collar 82 interfits with flange 102 of air duct 104 to retain the filter bag 80 on the duct. The rim 94 of the collar snaps over or overlaps the flange to provide such retention while also providing an air seal with the duct. As previously mentioned, the tab 100 facilitates collar removal from the flange which is effectuated by pulling thereon.

FIG. 9 illustrates further details of the mounting relationship of the filter bag 80 and the inlet air duct 104. As mentioned previously, the rim 94 overlaps or snaps over the flange 102. An inwardly protruding tip 106 of the rim provides for retention of the collar 82 and assures establishment of an air seal between the inner surface 108 of the rim and outer surface 110 of the flange. Another air seal is provided by the annular rib 96 which is spaced radially inward of the rim and which circumscribes the aperture 88 of the collar. The rib cooperates with or abuts face 112 of the flange to provide an air seal therewith.

While there has been shown and described herein preferred embodiments of the present invention, it should be apparent to persons skilled in the art that numerous modifications may be made therein without departing from the true spirit and scope of the invention. Accordingly, it is intended by the appended claims to cover all modifications which come within the spirit and scope of this invention.

I claim:

1. A vacuum cleaner filter bag having a filter body of air-pervious material with an opening therein for admitting dirt laden air into an interior portion thereof and a plastic collar specially adapted for use with a flanged air duct, said filter bag further comprising:
   (a) said plastic collar having a generally circular shaped aperture therethrough communicating with the opening in the filter body;
   (b) said plastic collar further including a base secured to the filter body and extending radially outwardly from the filter body opening with an outer periphery thereof terminating in an annular peripheral skirt; and
   (c) said annular peripheral skirt extending both axially in a direction away from the filter body and inwardly toward the axis of the filter body opening for cooperation with a flanged air duct for retention and sealing purposes.

2. The filter bag of claim 1 wherein said plastic collar includes a tab portion formed integrally with the annular peripheral skirt thereby facilitating removal of said plastic collar from a flanged air inlet duct.

3. The filter bag of claim 1 wherein said plastic collar is formed of polyethylene material.

4. The filter bag of claim 1 wherein said plastic collar is formed of polystyrene material.

5. A vacuum cleaner filter bag having a filter body of air-pervious material with an opening therein for admitting dirt laden air into an interior portion thereof and a plastic collar specially adapted for use with a flanged air duct, said filter bag further comprising:
   (a) said plastic collar having a generally circular shaped aperture therethrough communicating with the opening in the filter body;
   (b) said plastic collar further including a base secured to the filter body and extending radially outwardly from the bag opening with an outer periphery thereof terminating in an annular peripheral skirt;
   (c) said annular peripheral skirt extending both axially in a direction away from the filter body and inwardly toward the axis of the filter body opening for cooperation with a flanged air duct for retention purposes; and
   (d) an inner periphery of said base terminating in an annular sealing lip extending axially of the filter body opening and spaced radially inward of the annular peripheral skirt and concentric with the axis of the filter body opening for cooperation with an air duct for sealing purposes.

6. The filter bag of claim 5 wherein the annular peripheral skirt is resilient to facilitate gripping engagement with a flanged duct for sealing and retention purposes.

7. The filter bag of claim 5 wherein the annular sealing lip of the plastic collar is resilient thereby facilitating sealing engagement with a flanged air duct.

8. The filter bag of claim 5 wherein the plastic collar includes a tab portion formed integrally with the annular peripheral skirt thereby facilitating removal of said plastic collar from a flanged air duct.

9. A filter bag for use in a vacuum cleaner wherein the filter bag includes a filter body of air-pervious material with an opening therein for admitting dirt laden air into an interior portion of the filter bag, said filter bag further comprising:
   (a) a plastic collar secured to the filter body and having an aperture therethrough communicating with the opening in the filter body;
   (b) said plastic collar further comprising an outer wall interconnected with an inner wall thereof so as to provide an air inlet, duct-receiving channel therebetween;
   (c) said inner wall extending axially in a direction away from the filter body; and
   (d) said outer wall extending both axially in a direction away from the filter body and inwardly toward the axis of the filter bag opening.

10. The filter bag of claim 9 wherein said inner and outer walls are deflectable so as to provide an entrance to said duct-receiving channel therebetween thereby facilitating movement of an air duct into a captured position within said duct-receiving channel.

11. The filter bag of claim 9 wherein the plastic collar further includes a tab portion which extends about at least a portion of the periphery of the collar and which is integrally connected with the outer wall so as to facilitate removal of the collar from an air inlet duct.

* * * * *